United States Patent
Vellozo Luz et al.

(10) Patent No.: US 9,053,312 B2
(45) Date of Patent: *Jun. 9, 2015

(54) METHODS AND SYSTEMS FOR PROVIDING BIDIRECTIONAL AUTHENTICATION

(75) Inventors: Andre Gustavo Vellozo Luz, Sao Paulo (BR); Mauricio Ghetler, Sao Paulo (BR)

(73) Assignee: PAYCHIEF, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,766

(22) Filed: Jun. 19, 2012

(65) Prior Publication Data

US 2013/0340071 A1 Dec. 19, 2013

(51) Int. Cl.
- *G06F 21/00* (2013.01)
- *G06F 21/34* (2013.01)
- *G06F 21/36* (2013.01)

(52) U.S. Cl.
CPC ................ *G06F 21/34* (2013.01); *G06F 21/36* (2013.01)

(58) Field of Classification Search
USPC ............... 726/18, 19, 2–7, 27; 713/165–170; 348/207.1; 705/50, 64
See application file for complete search history.

(56) References Cited

U.S. PATENT DOCUMENTS

| | | | |
|---|---|---|---|
| 5,317,135 A | 5/1994 | Finocchio | |
| 6,993,507 B2 | 1/2006 | Meyer et al. | |
| 7,207,481 B2 | 4/2007 | Barenburg et al. | |
| 7,427,017 B2 | 9/2008 | Morrison et al. | |
| 7,909,243 B2 * | 3/2011 | Merkow et al. | 235/379 |
| 8,002,175 B2 | 8/2011 | Kuriyama et al. | |
| 8,214,619 B1 * | 7/2012 | Connolly et al. | 711/171 |
| 2002/0010800 A1 * | 1/2002 | Riley et al. | 709/249 |
| 2002/0111884 A1 * | 8/2002 | Groat et al. | 705/28 |
| 2003/0134648 A1 * | 7/2003 | Reed et al. | 455/456 |
| 2004/0039937 A1 * | 2/2004 | Aissi et al. | 713/201 |
| 2007/0277224 A1 * | 11/2007 | Osborn et al. | 726/2 |
| 2008/0313081 A1 | 12/2008 | Wee | |
| 2010/0017860 A1 * | 1/2010 | Ishida | 726/7 |
| 2010/0138344 A1 * | 6/2010 | Wong et al. | 705/44 |
| 2011/0029769 A1 * | 2/2011 | Aissi et al. | 713/155 |
| 2011/0246291 A1 * | 10/2011 | Paul | 705/14.49 |
| 2011/0251892 A1 * | 10/2011 | Laracey | 705/14.51 |
| 2011/0264586 A1 | 10/2011 | Boone et al. | |
| 2011/0270751 A1 * | 11/2011 | Csinger et al. | 705/42 |

(Continued)

OTHER PUBLICATIONS

Tesco Homplus Subway Virtual Store, Legendado PT, BR, YouTube: http://www.youtube.com/watch?v=1WBw1AmduSo.

(Continued)

*Primary Examiner* — Kambiz Zand
*Assistant Examiner* — Tongoc Tran
(74) *Attorney, Agent, or Firm* — Pepper Hamilton LLP (57) ABSTRACT

Methods and systems for providing access to a secure computing device are disclosed. A security device is used to generate a one-time password, a sequence of symbologies, and location information. The security device transmits the password, sequence and location information to the secure computing device for storage and displays the password and sequence to a user. A user device provides a password to the secure computing device in order to obtain access. The secure computing device compares the password with the stored one-time password to verify the user of the user device and sends the sequence to the user device in response. The user or user device verifies the sequence of symbologies to confirm the secure access. The location information may be used to detect fraudulent accesses to the user account.

18 Claims, 4 Drawing Sheets

(56) References Cited

U.S. PATENT DOCUMENTS

| | | | |
|---|---|---|---|
| 2011/0282965 A1 | 11/2011 | Dodson | |
| 2011/0283196 A1 | 11/2011 | Berger et al. | |
| 2011/0289009 A1 | 11/2011 | Rankin, Jr. et al. | |
| 2012/0060030 A1* | 3/2012 | Lamb | 713/166 |
| 2012/0203696 A1* | 8/2012 | Morgan et al. | 705/44 |
| 2012/0203701 A1 | 8/2012 | Ayuso de Paul | |
| 2013/0061337 A1* | 3/2013 | Zimberoff et al. | 726/30 |
| 2013/0069794 A1 | 3/2013 | Terwilliger et al. | |
| 2013/0124412 A1 | 5/2013 | Itwaru | |
| 2013/0167213 A1* | 6/2013 | Sandhu et al. | 726/7 |
| 2013/0205380 A1* | 8/2013 | Avni et al. | 726/7 |
| 2013/0232549 A1* | 9/2013 | Hawkes | 726/3 |
| 2013/0247159 A1* | 9/2013 | Hall et al. | 726/6 |
| 2013/0275308 A1* | 10/2013 | Paraskeva et al. | 705/71 |
| 2014/0090035 A1* | 3/2014 | Kodama | 726/6 |

OTHER PUBLICATIONS

Encrypted QR Codes: http://levelup.zendesk.com/hc/en-us/articles/200288027-What-is-LevelUp-and-how-do-I-pay-with-it-.

* cited by examiner

METHODS AND SYSTEMS FOR PROVIDING BIDIRECTIONAL AUTHENTICATION

BACKGROUND

Remote access to secure computing devices has rapidly increased. This increase has resulted in part from the prevalence of online applications that were once limited to brick-and-mortar settings. However, some of these online applications, such as online banking applications, require additional security to be provided to prevent fraudulent accesses. Moreover, spoofing websites may mimic the legitimate websites and intercept Internet traffic intended for such legitimate websites. Such spoofing websites can be used to steal personal information pertaining to an individual for fraudulent purposes. The use of online applications has increased further due to mobile technologies which provide the promise of more efficient use of time by allowing interactions with other people and institutions at any time and place.

Additional functionalities and components are becoming standard for mobile devices as well. For example, global positioning satellite (GPS) receivers are common in mobile devices.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of providing access to a secure computing device may include receiving, by a security device, a request to generate data for a secure access, generating, by the security device, a one-time password and a sequence of symbologies, transmitting, by the security device, the one-time password, the sequence of symbologies and user location information to a secure computing device, and displaying, by the security device, the one-time password and the sequence of symbologies to the user.

In an embodiment, a method of accessing a secure computing device may include receiving a one-time password, a first sequence of symbologies and user location information from a security device, accessing, by a user device, a secure computing device by providing the one-time password to the secure computing device, receiving, by the user device, a second sequence of symbologies from the secure computing device, verifying that the first sequence of symbologies matches the second sequence of symbologies and verifying the received user location information.

In an embodiment, a system for providing access to a secure computing device may include a processing device and a processor-readable storage medium in operable communication with the processing device. The processor-readable storage medium may contain one or more programming instructions that, when executed, cause the processing device to receive a request to generate data for a secure access, generate a one-time password and a sequence of symbologies, transmit the one-time password, the sequence of symbologies and the user location information to a secure computing device, and display the one-time password and the sequence of symbologies to the user.

DETAILED DESCRIPTION

The following terms shall have, for the purposes of this application, the respective meanings set forth below.

As used herein, the terms "sum," "product" and similar mathematical terms are construed broadly to include any method or algorithm in which a single datum is derived or calculated from a plurality of input data.

A "computing device" is an electronic device, such as, for example, a computer, a server, or components thereof. The computing device can be maintained by entities such as financial institutions, corporations, governments, and/or the like. The computing device may generally contain a memory or other storage device for housing programming instructions, data or information regarding a plurality of users, such as, for example, contact information, personal information, account information, account balances, account numbers and service login information. The computing device may also have data regarding product inventories, billing information, purchase order information, contracts, bills of sale, and/or the like. The data may optionally be contained on a database, which is stored in the memory or other storage device. The data may optionally be secured by any method now known or later developed for securing data. The computing device may further be in operable communication with one or more electronic devices, such as, for example, the mobile devices described herein. The communication between the computing device and each of the mobile devices may further be secured by any method now known or later developed for securing transmissions or other forms of communication. The computing device may further contain a registry of "authorized users" wherein the authorized users are users that have registered to use the systems and methods described herein. Users may obtain "authorized user" status by, for example, providing contact information, account information, and/or the like. An illustrative computing device is described in reference to FIG. 4. A "secure computing device" refers to a computing device that requires authentication from its users through a secure device such as a mobile electronic device with application software for generating specific information, such as a one-time password for access to computer resources of the secure computing device.

An "electronic device" refers to an electronic device that includes a processing device and tangible, computer-readable memory. The memory may contain programming instructions that, when executed, by the processing device, cause the electronic device to perform one or more operations according to the programming instructions. Examples of electronic devices include personal computers, gaming systems, televisions and mobile electronic devices.

"Location information" refers to any information that identifies a precise or approximate position of a person or a device. Location information may include global positioning satellite (GPS) information, a location identified by a mobile electronic device tracking scheme and/or the like.

A "mobile electronic device" refers to a portable electronic device that is capable of interfacing with other electronic devices via a wireless communication scheme. Examples of mobile electronic devices include pagers, cellular phones, feature phones, smartphones, personal digital assistants (PDAs), cameras, tablet computers, phone-tablet hybrid devices, laptop computers, netbooks, ultrabooks, GPS navigation devices, in-dash automotive components, media players, watches and the like.

A "security device" refers to a device used to generate a one-time password. A security device may be a mobile electronic device that generates a unique password upon request for a secure access. A security device may further provide a sequence of symbologies upon request for a secure access.

A "symbology" refers to a pattern, a symbol, an image or the like, as well as a portion or a combination thereof. The symbology may be used to provide a visual indication to a user or a device. Symbologies may be of any geometric shape or size.

A "user device" refers to a mobile electronic device or a computing device operated by a user.

The present disclosure is directed to methods and systems for providing secure access to a site, such as a website accessible via the Internet, using a select set of data accessible by a user on a mobile electronic device.

Figure 1:
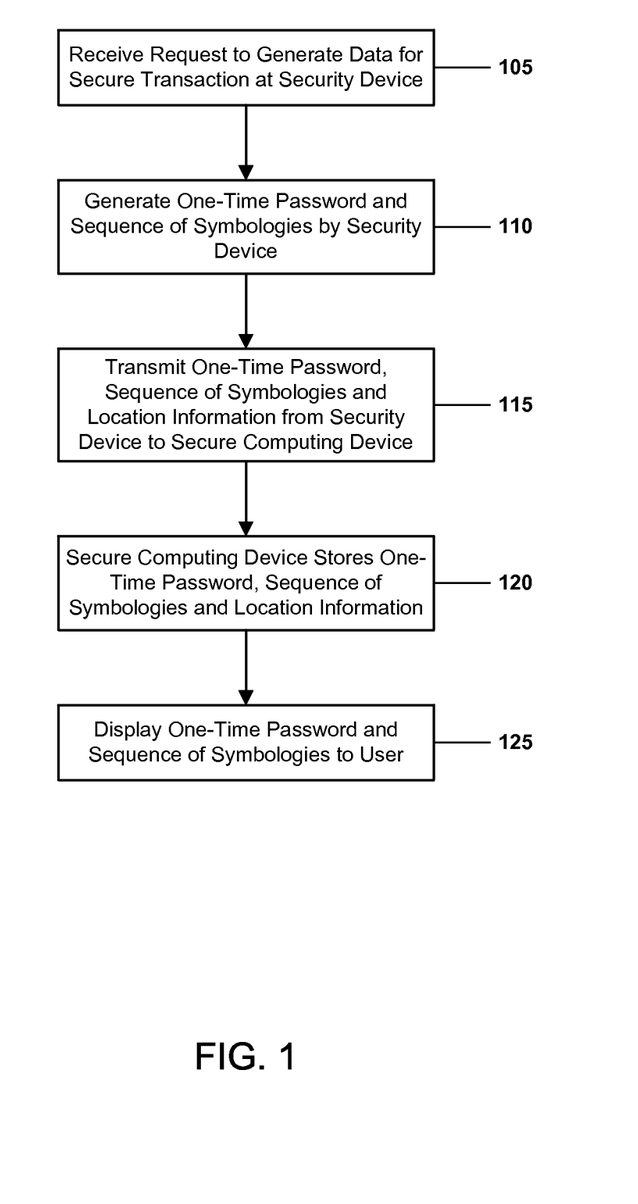
FIG. 1 depicts a flow diagram of an illustrative method of providing access to a secure computing device according to an embodiment.

FIG. 1 depicts a flow diagram of an illustrative method of providing access to a secure computing device according to an embodiment. As shown in FIG. 1, a security device may receive 105 a request to generate data for a secure transaction. In an embodiment, the request may be received 105 from a user that possesses the security device at the time of the request. In an embodiment, the request may be made by received 105 via a tactile or haptic user input device, such as a keypad, a button, a touchscreen or the like, an audio user input device, such as a microphone, or other user input devices, such as a retinal scanner. In an alternate embodiment, the request may be received 105 from an electronic device in operable communication with the security device, such as via a wired or wireless connection. In such an embodiment, a user may indicate such a request via the electronic device, which transmits a signal to the security device requesting that the data be generated.

The security device may generate 110 a one-time password and a sequence of symbologies in response to receiving 105 the request. In an embodiment, the sequence of symbologies may be uniquely generated 110 in response to the request. In other words, the sequence of symbologies may not be consistently identified with, for example, a particular user, but rather are determined on a request-by-request basis. In an embodiment, the one-time password and/or the sequence of symbologies may be generated randomly. In an alternate embodiment, the one-time password and/or the sequence of symbologies may be generated pseudo-randomly. Methods for random and/or pseudo-random determination of the password and the sequence of symbologies will be apparent to those of ordinary skill in the art based upon this disclosure.

The security device may transmit 115 the one-time password, the sequence of symbologies and user location information to a secure computing device. The secure computing device is configured to store 120 the information for a later secure access by the user. In an embodiment, the one-time password may expire after a particular time period. For example, if the one-time password is not used to access the secure computing device within 1 hour, the secure password may be deleted, rendered invalid or the like.

In an embodiment, the security device may identify location information regarding the location of the security device. The location information may be determined by using a GPS system embedded in or in communication with the security device. The security device may transmit the location information to the secure computing device.

The location information may be used to identify the location of the security device at the time that the one-time password is requested 105. Such information may be used as a means of fraud detection in a variety of ways. For example, the location information may be used to determine whether an access has occurred from an unexpected location. This may occur if a previous access to a user account was from a location not visited by the user. Such an evaluation may be performed by the user upon accessing the account and being presented with location information from one or more previous accesses. Similarly, the location information may be compared between a time at which the one-time password was requested 105 and a time at which the one-time password is used to access the secure computing device (see below). When viewed in concert with timestamps associated with the request 105 or storage 120 of the one-time password and the access of the secure computing device, a determination may be made as to whether the secure computing device is accessed by a fraudulent user. For example, if the first location information identifies a location in New York City, the second location information identifies a location in Utah and the difference in timestamps is 30 minutes, the computing device may deny the transaction as being fraudulent. Additional and/or alternate uses for location information will be apparent based on this disclosure.

The security device may display 125 the one-time password and the sequence of symbologies to a user of the device. Displaying 125 the one-time password and the sequence of symbologies to the user may enable the user to access the secure computing device in a secure manner via a user computing device as is further described below in reference to FIG. 2.

Figure 2:
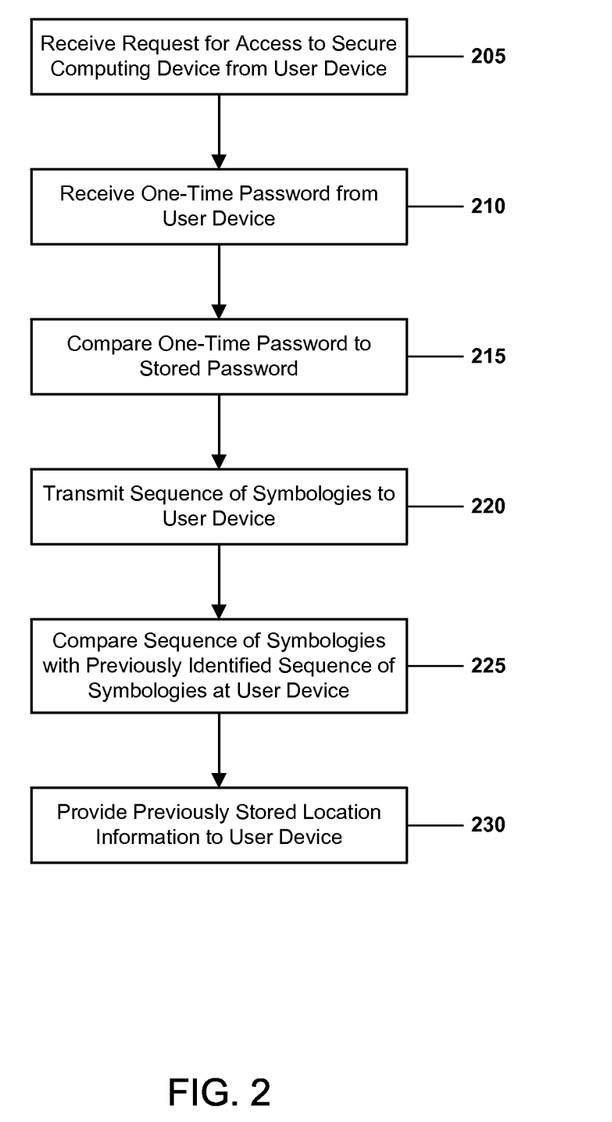
FIG. 2 depicts a flow diagram of an illustrative method of accessing a secure computing device according to an embodiment.

FIG. 2 depicts a flow diagram of an illustrative method of accessing a secure computing device according to an embodiment. As shown in FIG. 2, a secure computing device may be accessed 205 in an insecure manner from a user device. For example, the user device may access 205 a website hosted by the secure computing device that enables financial transactions to be performed with respect to an account associated with a user. Alternate and/or additional secure computing devices may also be accessed 205 according to the methods and systems disclosed herein within the scope of this disclosure.

The secure computing device may receive 210 the one-time password from the user device as part of a login process. For example, the secure computing device may receive 210 an account designator or user identification and the one-time password from the user device. Additional and/or alternate information may also be received from the user device within the scope of this disclosure.

The secure computing device may compare 215 the one-time password that is received 210 from the user device with a previously stored one-time password. In an embodiment, the previously stored one-time password may be received according to the process described in reference to FIG. 1 or an equivalent or similar process. In an embodiment, the secure computing device may prevent access by the user device if the received 210 one-time password does not match the stored one-time password. In an alternate embodiment, the user device may gain access to the secure computing device only for insecure operations if the received 210 one-time password does not match the stored one-time password. In an embodiment, an error message may be transmitted to the user device if the received 210 one-time password does not match the stored one-time password. The secure computing device may wait to receive 210 the one-time password from the user device if the received one-time password does not match the stored one-time password.

If the received 210 one-time password matches the stored one-time password, the secure computing device may transmit 220 the sequence of symbologies to the user device. Transmitting 220 the sequence of symbologies to the user may enable the user device or a user operating the user device to verify that the user device is accessing the proper computing device. In particular, transmitting 220 the sequence of symbologies may enable the user device or a user operating the user device to compare 225 the sequence of symbologies with a previously received sequence of symbologies, such as the sequence of symbologies received from the security device according to the process described in reference to FIG. 1 or an equivalent or similar process. By using a distinct sequence of symbologies for each access to the secure computing device, the user may be provided with greater assurance of security as compared to a static sequence of symbologies, which could be copied by a spoofing website and used to commit a fraud upon the user.

The secure computing device may provide 230 various information to the user device associated with the user account via the user device. In an embodiment, the secure computing device may provide 230 information regarding the location from which the one-time password was requested for the present user access. In an embodiment, the secure computing device may provide 230 location information for one or more prior accesses to the user account. Either or both of these accesses may enable the user to monitor whether fraudulent accesses to the user account had occurred in the past. As stated above, the location information may correspond to coordinates from a GPS system or any other information that enables a user device or a user operating the user device to determine a location for a user account access and/or a security device access.

The interactive process described in FIGS. 1 and 2 provides a bidirectional authentication scheme between a user device and a secure computing device. Both the user device and a secure computing device can verify that a correct and secure connection is formed between the devices.

Figure 3:
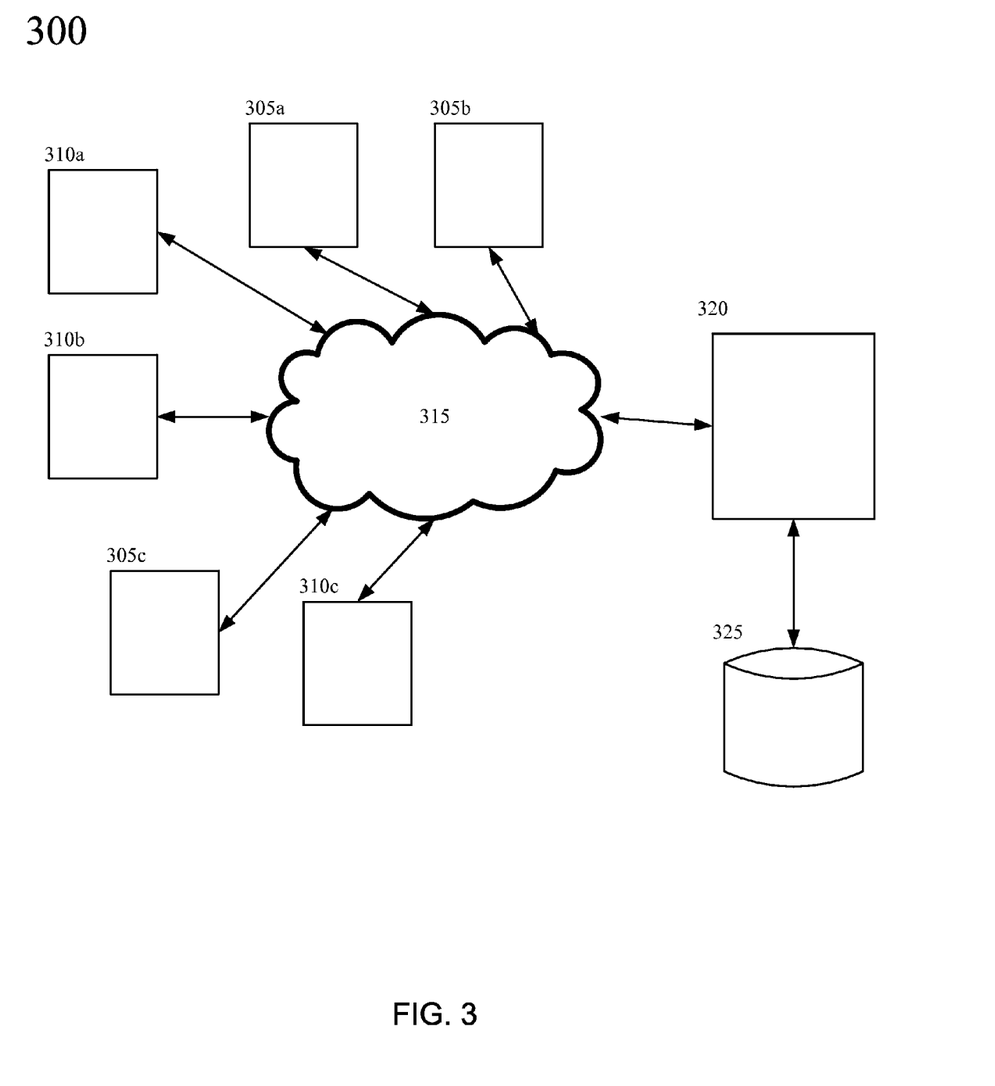
FIG. 3 depicts a block diagram of an illustrative system for providing access to a secure computing device interacting with a user device according to an embodiment.

FIG. 3 depicts a block diagram of an illustrative system for providing access to a secure computing device interacting with a user device according to an embodiment. As shown in FIG. 3, the system 300 may include a plurality of security devices, such as 305a-c, configured to perform the process described in reference to FIG. 1 or an equivalent or similar process, and a plurality of user devices 310a-c. The security devices 305a-c and the user devices 310a-c may be operably connected to a network 315 via a wired or wireless connection. The network 315 may include a local area network, a wide area network, an intranet, the Internet, and/or the like.

A secure computing device 320 may also be operably connected to the network 315 and configured to perform the process described above in reference to FIG. 2 or an equivalent or similar process. The computing device 320 may be operably connected to additional computing devices such as content servers, edge servers, and other similar networking components or data storage devices. The computing device 320 may also be operably connected to a data storage device, such as database 325. In an embodiment, the database 325 may store one or more one-time passwords received from security devices, such as 305a-c, and location information from one or more security devices and/or one or more user devices 310a-c that access the secure computing device 320.

Figure 4:
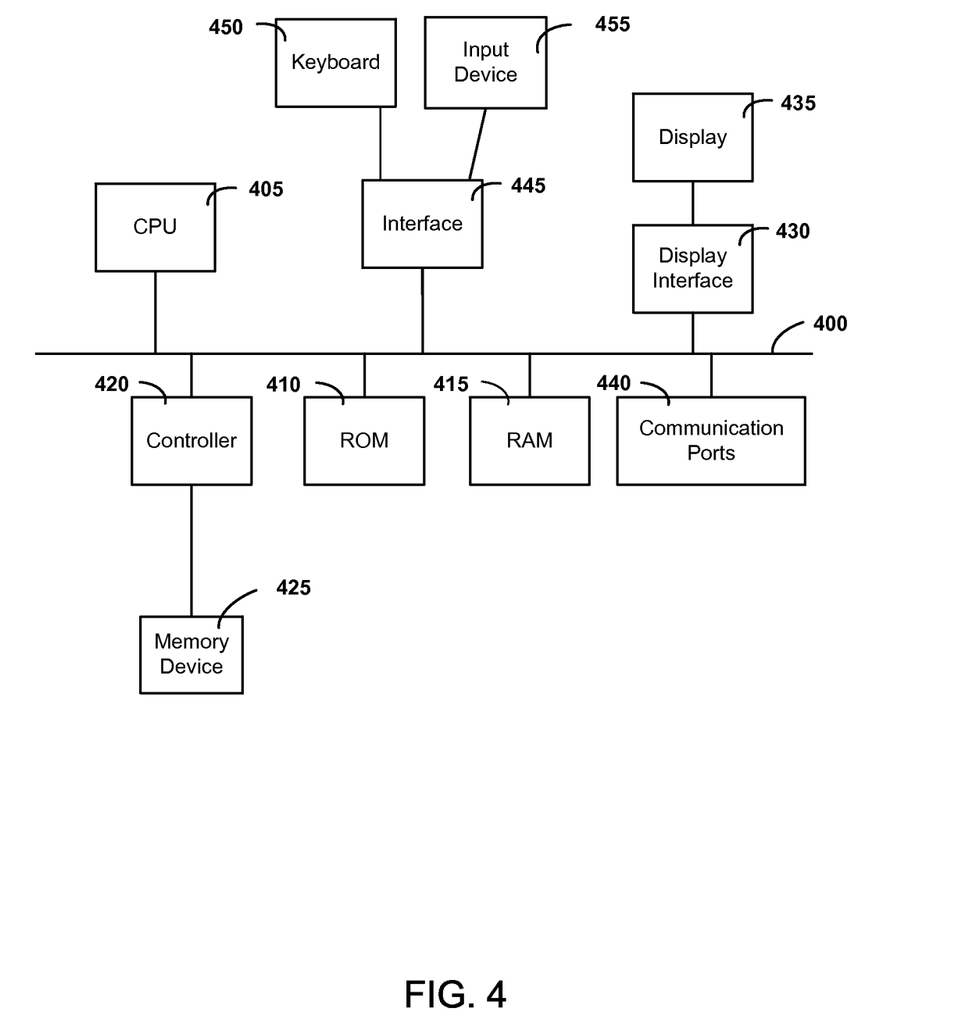
FIG. 4 depicts a block diagram of illustrative internal hardware that may be used to contain or implement program instructions according to an embodiment.

FIG. 4 depicts a block diagram of illustrative internal hardware that may be used to contain or implement program instructions, such as the process steps discussed above in reference to FIGS. 1 and 2, according to embodiments. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an illustrative processing device, computing device or processor as such terms are used within this disclosure. Read only memory (ROM) 410 and random access memory (RAM) 415 constitute illustrative memory devices (i.e., processor-readable non-transitory storage media).

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 430 may permit information from the bus 400 to be displayed on the display 435 in audio, visual, graphic or alphanumeric format. Communication with external devices, such as a print device, may occur using various communication ports 440. An illustrative communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:
1. A method of providing bidirectional authentication between a user device and a secure computing device, the method comprising:
  receiving, by a security device, a request to generate data for secure access between the user device and the secure computing device;

generating, by the security device, a one-time password and a unique sequence of symbologies in response to receiving the request;

transmitting, by the security device, the one-time password, the unique sequence of symbologies and location information to a secure computing device, wherein the location information corresponds to a location of the security device and wherein the one-time password, the unique sequence of symbologies and the location information are configured to provide the secure computing device with an ability to establish the bidirectional authentication between the user device and the computing device; and displaying, by the security device, the one-time password and the unique sequence of symbologies to a user such that the user provides the one-time password to the secure computing device via the user device and receives an authenticating sequence of symbologies from the secure computing device in response, wherein the bidirectional authentication is established when the user device confirms the unique sequence of symbologies matches the authenticating sequence of symbologies.

2. The method of claim 1, wherein the location information comprises location information determined by a global positioning satellite (GPS) system.

3. The method of claim 1, wherein the one-time password expires after a time period.

4. The method of claim 1, wherein generating the one-time password and the unique sequence of symbologies comprises randomly or pseudo-randomly generating the one-time password.

5. The method of claim 1, wherein generating the one-time password and the unique sequence of symbologies comprises randomly or pseudo-randomly generating the unique sequence of symbologies.

6. A method of establishing bidirectional authentication between a user device and a secure computing device, the method comprising:

receiving, by the secure computing device, a first one-time password and a first unique sequence of symbologies from a security device, wherein the first one-time password and the first unique sequence of symbologies are generated by the security device in response to a request to access the secure computing device;

receiving, by the secure computing device, a second one-time password from the user device;

determining, by the secure computing device, whether the first one-time password matches the second one-time password;

if the first one-time password matches the second one-time password, transmitting, by the secure computing device, the first unique sequence of symbologies to the user device for authentication; and if a confirmation is received from the user device that the first unique sequence of symbologies matches a second unique sequence of symbologies obtained by the user device from the security device:

confirming, by the secure computing device, the user device to establish the bidirectional authentication, and granting, by the secure computing device, secure access to the user device.

7. The method of claim 6, further comprising receiving, by the secure computing device, location information for the user device.

8. The method of claim 7, wherein the location information comprises location information determined by a global positioning satellite (GPS) system.

9. The method of claim 6, further comprising:

receiving, by the secure computing device, a request for location information pertaining to a location at which the first one-time password was generated; and transmitting, by the secure computing device, the location information.

10. The method of claim 6, further comprising:

receiving, by the secure computing device, a request for location information pertaining to a location of the last valid login to an account; and transmitting, by the secure computing device, the location information.

11. The method of claim 6, wherein the first one-time password expires after a time period.

12. A system for providing bidirectional authentication between a user device and a secure computing device, the system comprising:

a processing device; and a processor-readable storage medium in operable communication with the processing device, wherein the processor-readable storage medium contains one or more programming instructions that, when executed, cause the processing device to:

receive a request to generate data for secure access between the user device and the secure computing device, generate a one-time password and a unique sequence of symbologies in response to receiving the request, transmit the one-time password, the unique sequence of symbologies and location information to a secure computing device, wherein the location information corresponds to a location of the security device and wherein the one-time password, the unique sequence of symbologies and the location information are configured to provide the secure computing device with an ability to establish the bidirectional authentication between the user device and the computing device, and display the one-time password and the unique sequence of symbologies to a user such that the user provides the one-time password to the secure computing device via the user device and receives an authenticating sequence of symbologies from the secure computing device in response, wherein the bidirectional authentication is established when the user device confirms the unique sequence of symbologies matches the authenticating sequence of symbologies.

13. The system of claim 12, wherein the location information comprises location information determined by a global positioning satellite (GPS) system.

14. The system of claim 12, wherein the one-time password expires after a time period.

15. The system of claim 12, wherein the one or more programming instructions that, when executed, cause the processing device to generate the one-time password and the unique sequence of symbologies comprise one or more programming instructions that, when executed, cause the processing device to randomly or pseudo-randomly generate the one-time password.

16. The system of claim 12, wherein one or more programming instructions that, when executed, cause the processing device to generate the one-time password and the unique sequence of symbologies comprise one or more programming instructions that, when executed, cause the processing device to randomly or pseudo-randomly generate the unique sequence of symbologies.

17. The method of claim 6, further comprising:
if the first one-time password does not match the second one-time password, preventing, by the secure computing device, access to the user device.

18. The method of claim 6, further comprising:
if the first one-time password does not match the second one-time password, granting, by the secure computing device, insecure access to the user device.

* * * * *